United States Patent
Erban et al.

(10) Patent No.: US 9,855,946 B2
(45) Date of Patent: Jan. 2, 2018

(54) METHOD AND DEVICE FOR AVOIDING A COLLISION OF A MOTOR VEHICLE WITH AT LEAST ONE OTHER OBJECT WHICH APPROACHES THE MOTOR VEHICLE IN SUCH A WAY THAT A COLLISION BETWEEN THE MOTOR VEHICLE AND THE APPROACHING OBJECT IS IMMINENT

(71) Applicant: Robert Bosch GmbH, Stuttgart (DE)

(72) Inventors: Andreas Erban, Loechgau (DE); Volker Hofsaess, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/180,294

(22) Filed: Jun. 13, 2016

(65) Prior Publication Data

US 2016/0368490 A1    Dec. 22, 2016

(30) Foreign Application Priority Data

Jun. 18, 2015 (DE) .......................... 10 2015 211 276

(51) Int. Cl.
| | |
|---|---|
| *B60W 30/08* | (2012.01) |
| *G01S 11/12* | (2006.01) |
| *B60Q 9/00* | (2006.01) |
| *B60Q 1/46* | (2006.01) |
| *B60T 7/22* | (2006.01) |
| *B62D 15/02* | (2006.01) |
| *B60T 8/1755* | (2006.01) |

(52) U.S. Cl.
CPC .............. *B60W 30/08* (2013.01); *B60Q 1/46* (2013.01); *B60Q 9/008* (2013.01); *B60T 7/22* (2013.01); *B60T 8/17558* (2013.01); *B62D 15/0265* (2013.01); *B60T 2201/022* (2013.01); *B60T 2210/12* (2013.01); *B60W 2520/10* (2013.01); *B60W 2550/148* (2013.01)

(58) Field of Classification Search
CPC .... B60W 30/08; B60T 8/17558; G01S 11/12; G08G 1/091
See application file for complete search history.

(56) References Cited

U.S. PATENT DOCUMENTS

| | | | |
|---|---|---|---|
| 9,108,600 B2* | 8/2015 | Hartmann | ........... B60T 8/17558 |
| 2006/0178830 A1* | 8/2006 | Sherony | .................. G01S 11/12 |
| | | | 701/301 |
| 2011/0012755 A1* | 1/2011 | Mudalige | ............... G08G 1/091 |
| | | | 340/905 |

FOREIGN PATENT DOCUMENTS

| | | |
|---|---|---|
| DE | 10334203 | 3/2005 |
| DE | 102004057060 | 6/2006 |
| DE | 102005054754 | 5/2007 |

(Continued)

*Primary Examiner* — Yuri Kan
(74) *Attorney, Agent, or Firm* — Norton Rose Fulbright US LLP; Gerard Messina

(57) ABSTRACT

A method and a device for avoiding a collision of a motor vehicle with at least one other object which approaches the motor vehicle in such a way that a collision between the motor vehicle and the approaching object is imminent, a friction coefficient variable being ascertained which represents the friction coefficient potential of the motor vehicle, and at least one action for avoiding and/or reducing the consequences of a collision between the motor vehicle and the approaching object being carried out as a function of the friction coefficient variable.

10 Claims, 3 Drawing Sheets

(56) References Cited

FOREIGN PATENT DOCUMENTS

| | | |
|---|---|---|
| DE | 102008040077 | 1/2010 |
| DE | 102013019027 | 5/2015 |

* cited by examiner

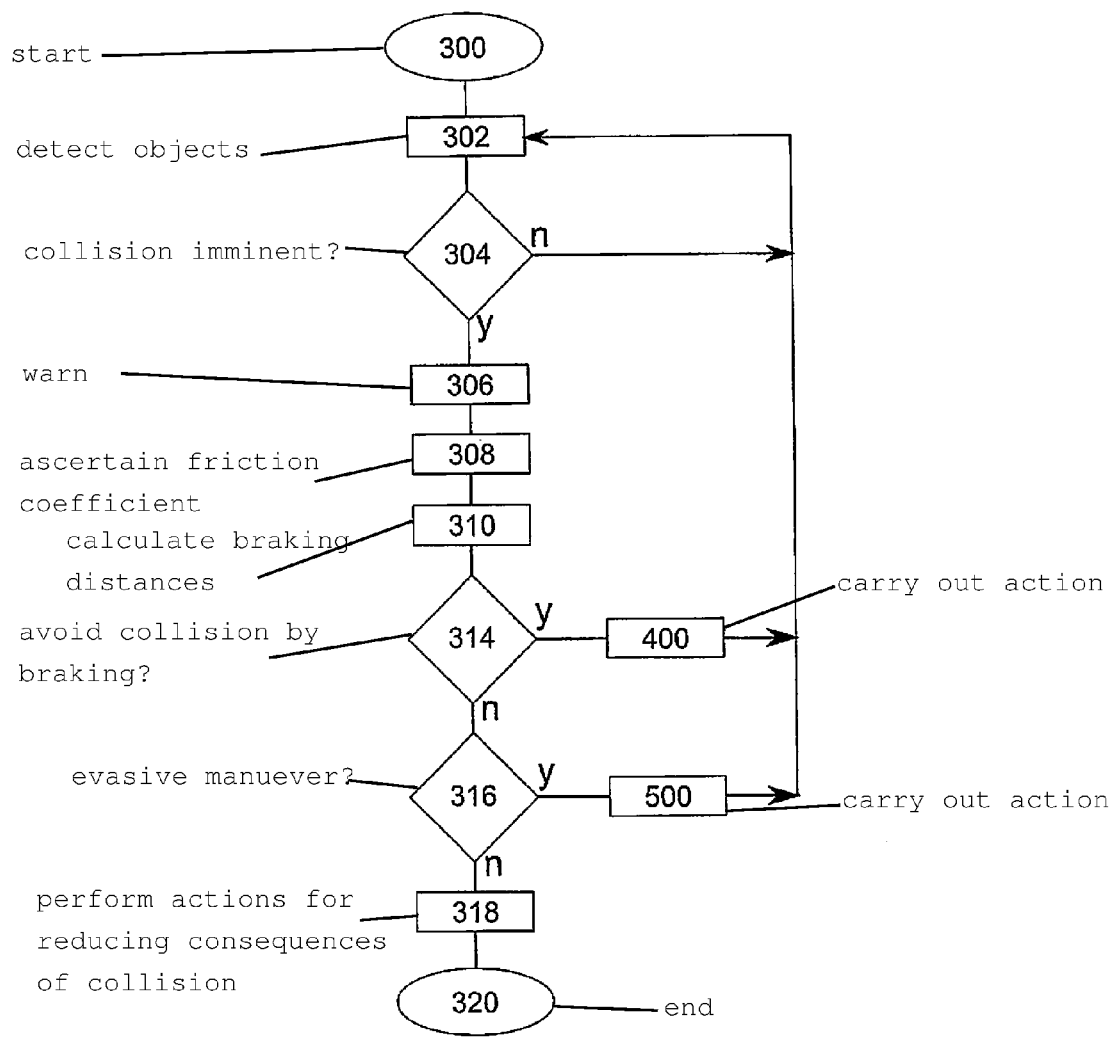

METHOD AND DEVICE FOR AVOIDING A COLLISION OF A MOTOR VEHICLE WITH AT LEAST ONE OTHER OBJECT WHICH APPROACHES THE MOTOR VEHICLE IN SUCH A WAY THAT A COLLISION BETWEEN THE MOTOR VEHICLE AND THE APPROACHING OBJECT IS IMMINENT

CROSS REFERENCE

The present application claims the benefit under 35 U.S.C. §119 of German Patent Application No. DE 102015211276.4 filed on Jun. 18, 2015, which is expressly incorporated herein by reference in its entirety.

FIELD

The present invention relates to a method and a device for motor vehicles for avoiding collisions due to approaching objects. Both the distances and the speeds of the approaching objects with respect to a motor vehicle are taken into account, and in addition, the friction coefficient potential is used for taking into account the necessary actions which are to be carried out for the avoidance.

BACKGROUND INFORMATION

Methods for avoiding collisions between motor vehicles and other objects, for example, other motor vehicles or bicycle riders, pedestrians, and immovable objects, have existed for several years, and are already being installed in motor vehicles as standard equipment.

Particularly serious collisions frequently occur if two motor vehicles collide head-on. It is not uncommon for accidents of this type to be fatal, particularly as the speed of the two motor vehicles may be high particularly on freeways, and the relative speed between the two motor vehicles may be very high.

German Patent Application No. DE 10 2009 020 647 A1 describes a method for collision avoidance or collision consequence mitigation for motor vehicles. Here, among other things, a time-distance relationship is used for selecting the necessary actions, taking into consideration the surroundings of a motor vehicle.

SUMMARY

An example method according to the present invention and an example device according to the present invention for avoiding a collision of a motor vehicle with at least one other object assume that the object approaches the motor vehicle in such a way that a collision between the motor vehicle and the approaching object is imminent.

In accordance with the present invention, a friction coefficient variable is ascertained which represents the friction coefficient potential of the motor vehicle, and at least one action for avoiding and/or reducing the consequences of a collision between the motor vehicle and the approaching object is carried out as a function of the friction coefficient variable. The friction coefficient variable or the friction coefficient potential indicates, for example, the instantaneous prevailing friction behavior between the vehicle tires and the roadway. It is lower, for example, for black ice, snow, or a wet roadway than for a dry roadway.

The present invention may have the advantage that the friction coefficient potential of the motor vehicle or the approaching object is also taken into consideration for actually selecting the necessary actions which are carried out for avoiding and/or reducing the consequences of a collision between a motor vehicle and an approaching object. With the aid of the friction coefficient potential, the braking distance of the motor vehicle may be determined in a highly accurate manner, and highly differentiated actions for mitigating and/or reducing the consequences of a collision may thus be derived. Taking into consideration the associated friction coefficient potential of the approaching object, a highly accurate determination of the actual danger due to a collision between the motor vehicle and the approaching object is furthermore obtained, additionally as a function of the speeds also recorded of the motor vehicle and of the object relative to the motor vehicle, as well as the distance between the motor vehicle and the approaching object. Many collisions may be avoided through a combination of different actions based on these data, such as braking and/or evasion.

Preferably, a first speed value which represents the speed of the motor vehicle and a second speed value which represents the speed of the approaching object relative to the motor vehicle are ascertained. At least a first braking distance value which represents the braking distance of the motor vehicle and/or at least a second braking distance value which represents the braking distance of the approaching object is/are then determined, as a function of the friction coefficient variable, the first speed value, and the second speed value. Furthermore, at least one action for avoiding and/or reducing the consequences of a collision between the motor vehicle and the approaching object is carried out, as a function of the determined first braking distance value of the motor vehicle and/or the determined second braking distance value.

In one particularly preferred specific embodiment, a distance value which represents the distance between the motor vehicle and the approaching object is ascertained, and from the ascertained first braking distance value of the motor vehicle and the ascertained second braking distance value of the approaching object, an absolute braking distance is determined as the sum of the braking distance of the motor vehicle and the braking distance of the approaching object. Furthermore, this absolute braking distance is compared with the distance between the motor vehicle and the approaching object, and at least one action for avoiding and/or reducing the consequences of a collision between the motor vehicle and the approaching object is carried out as a function of predefined comparison criteria.

Preferably, the driver of the motor vehicle is informed about the imminent collision due to the approaching object, for example, via haptic and/or audible and/or visual signals, and/or the approaching object and/or the surroundings of the motor vehicle for example, via flashing of the tail lights and/or warning lights and/or brake lights and/or low-beam lights and/or high-beam lights and/or fog lights, and/or via audible signals and/or radio signals.

The driver of the motor vehicle is preferably informed about a braking operation, as a function of the distance, the first speed value, and/or the second speed value, as an action for avoiding a collision between the motor vehicle and the approaching object. If a comparison with the distance between the motor vehicle and the approaching object indicates that the absolute braking distance is sufficient, according to the comparison criteria, to avoid a collision between the motor vehicle and the approaching object, the driver of the motor vehicle may be assisted when braking, for example, via an increased brake boost, and/or the motor vehicle automatically brakes with full deceleration as soon as the driver brakes.

In one particularly preferred specific embodiment, the motor vehicle brakes automatically and/or automatically with full deceleration, as a function of the distance, the first speed value, and/or the second speed value, as an action for avoiding a collision between the motor vehicle and the approaching object, when the driver of the motor vehicle does not brake. This happens if a comparison with the distance between the motor vehicle and the approaching object indicates that the absolute braking distance is sufficient, according to the comparison criteria, to avoid a collision between the motor vehicle and the approaching object.

The driver of the motor vehicle is preferably informed about an evasive maneuver, as a function of the distance, the first speed value, and/or the second speed value, as an action for avoiding a collision between the motor vehicle and the approaching object, and/or the driver is informed while steering about which evasion direction would be advantageous via a haptic and/or audible and/or visual signal, and/or the driver is assisted while steering via an adjustment of the steering behavior on the part of the motor vehicle. This happens if a comparison with the distance between the motor vehicle and the approaching object indicates that the absolute braking distance is not sufficient, according to the comparison criteria, to avoid a collision between the motor vehicle and the approaching object.

In one particularly preferred specific embodiment, the evasion by the driver of the motor vehicle is adjusted via an automatic adjustment of the direction and/or the speed on the part of the motor vehicle, and/or an automated evasive maneuver of the motor vehicle is carried out, as a function of the distance, the first speed value, and/or the second speed value, as an action for avoiding a collision between the motor vehicle and the approaching object. This happens if a comparison with the distance between the motor vehicle and the approaching object indicates that the absolute braking distance is not sufficient, according to the comparison criteria, to avoid a collision between the motor vehicle and the approaching object.

According to the present invention, a device is provided for avoiding a collision of a motor vehicle with at least one other object which approaches the motor vehicle in such a way that a collision between the motor vehicle and the approaching object is imminent. The device furthermore includes means with the aid of which a friction coefficient variable which represents the friction coefficient potential of the motor vehicle may be ascertained, and at least one action for avoiding and/or reducing the consequences of a collision between the motor vehicle and the approaching object may be carried out as a function of the friction coefficient variable.

Preferably, the device furthermore includes an element with the aid of which a first speed value which represents the speed of the motor vehicle and a second speed value which represents the speed of the approaching object relative to the motor vehicle may be ascertained. In addition, with the aid of this element, at least a first braking distance value which represents the braking distance of the motor vehicle and/or at least a second braking distance value which represents the braking distance of the approaching object may be determined, as a function of the friction coefficient variable, the first speed value, and the second speed value. At least one action for avoiding and/or reducing the consequences of a collision between the motor vehicle and the approaching object may be carried out, as a function of the determined first braking distance value of the motor vehicle and/or the determined second braking distance value.

Advantageous refinements of the present invention are described below.

BRIEF DESCRIPTION OF THE DRAWINGS

Exemplary embodiments of the present invention are depicted in the figures and are explained in greater detail below.

FIG. 3 shows an exemplary embodiment of a method according to the present invention for avoiding a collision of a motor vehicle with at least one additional object which approaches the motor vehicle in such a way that a collision between the motor vehicle and the approaching object is imminent.

DETAILED DESCRIPTION OF EXAMPLE EMBODIMENTS

Figure 1:
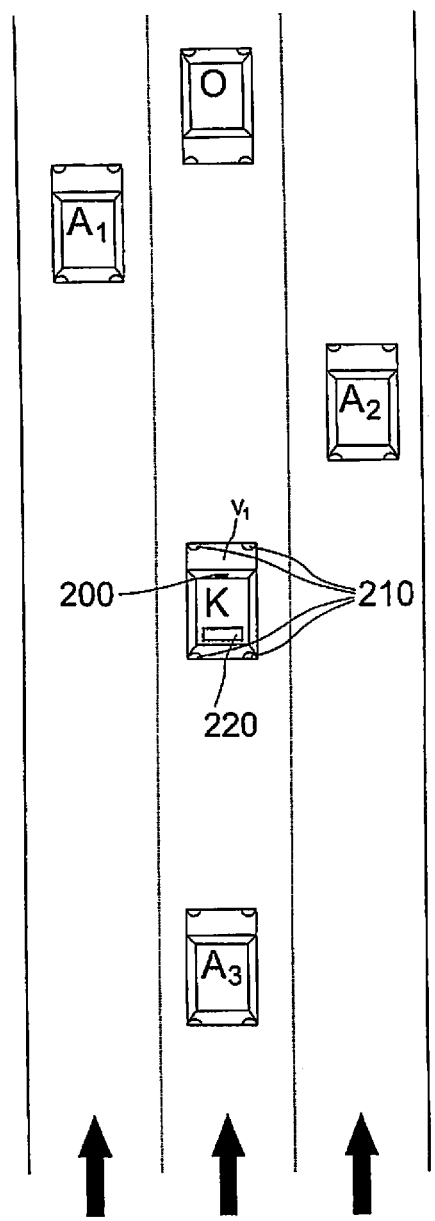
FIG. 1 shows a section of road with a motor vehicle and additional objects which are moving in the same direction along with the motor vehicle, and an object which is approaching the motor vehicle against the direction of travel in such a way that a collision between the motor vehicle and the approaching object is imminent.

FIG. 1 depicts a section of road, shown here by way of example as a section of a three-lane freeway, on which a motor vehicle K, a first object O, and other objects A1, A2, A3 are present. First object O and other objects A1, A2, A3 are depicted here purely by way of example as motor vehicles.

First object O is an object which is approaching motor vehicle K in such a way that a collision between motor vehicle K and approaching object O is imminent. Additional objects A1, A2, A3 and motor vehicle K are using the section of road in the direction of the predefined direction, which is depicted by the black arrows, and object O approaching motor vehicle K is using the section of road depicted here by way of example in a direction which is against the intended direction of travel. Here, approaching object O is by way of example a motor vehicle which is commonly referred to as a ghost driver.

The method according to the present invention may also be used on other road types and in other traffic situations, for example, on a road which is made up of a total of two lanes, having one lane per direction of travel. Approaching object O may, for example, be a motor vehicle which is approaching motor vehicle K in its lane, since it, for example, would like to overtake another object which is present in its own lane, which is present ahead of object O in the direction of travel.

As depicted in FIG. 1 by way of example, motor vehicle K includes an element 200 according to the present invention, for example, radar sensors and/or video sensors and/or additional sensors, for detecting objects present in the surroundings of the motor vehicle, and additional element 220 for being able to ascertain such objects O which are approaching motor vehicle K in such a way that a collision with this object O is imminent for motor vehicle K, and for being able to carry out at least one action for avoiding and/or reducing the consequences of a collision between motor vehicle K and approaching object O.

As depicted in FIG. 1, according to the method, motor vehicle K may, for example, use parts of a light system 210 which is present, for example, on the outside of motor vehicle K, to warn approaching object O and additional objects A1, A2, A3. The light system of motor vehicle K depicted here by way of example may, for example, be the flashing lights and/or warning lights and/or low-beam lights and/or other lights.

Figure 2:
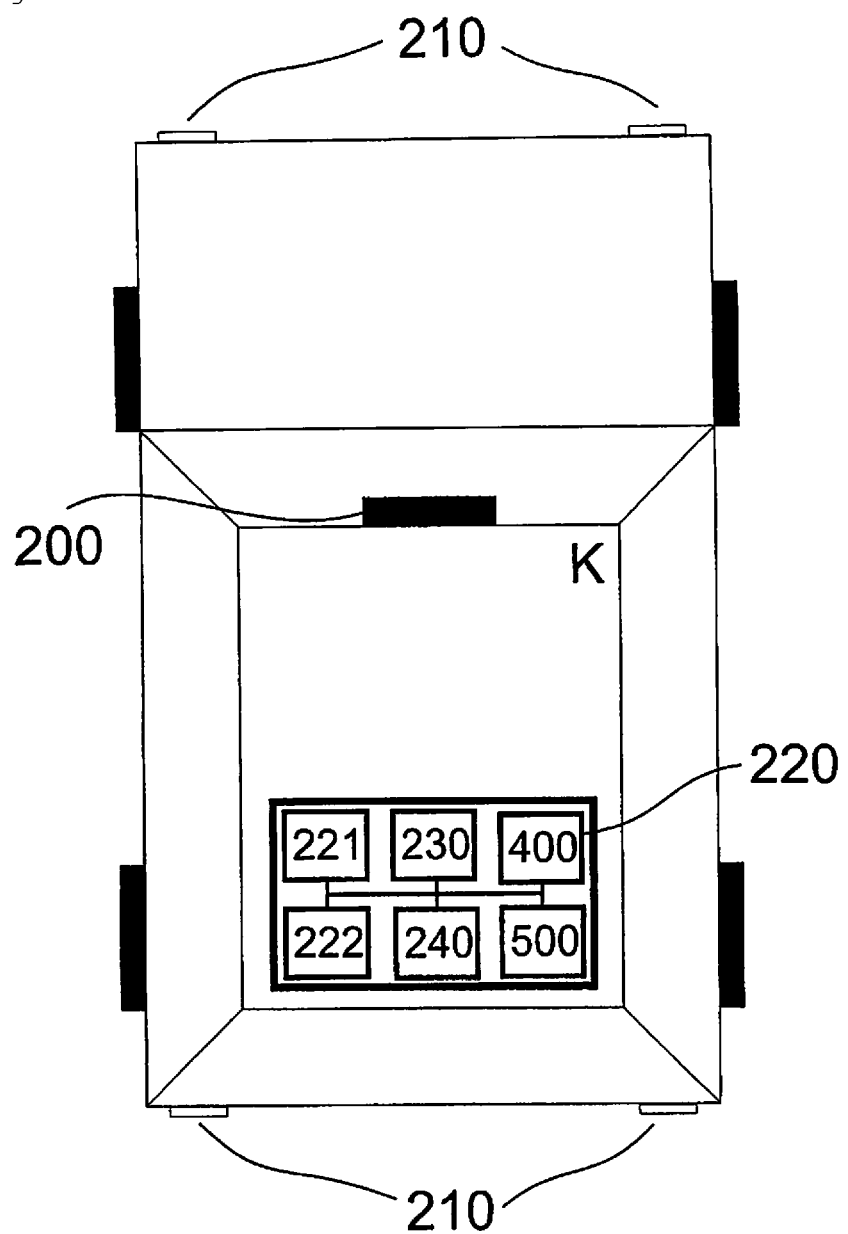
FIG. 2 shows a motor vehicle including an element for avoiding and/or reducing the consequences of a collision between a motor vehicle and an approaching object.

FIG. 2 shows a detailed depiction of motor vehicle K. Element 220 is depicted by way of example, which is made up of additional element 221 for controlling light system 210 according to the method, and element 222 for receiving and processing the data received according to the method with the aid of element 200.

In addition, additional element 230 is present, which detects an object O from the processed data, which, according to the method according to the present invention, is approaching motor vehicle K in such a way that a collision between motor vehicle K and approaching object O is imminent.

With the aid of available element 240, the hazardous situation for motor vehicle K caused by approaching object O may be evaluated, and actions may be carried out with the aid of additional elements 400, 500 for avoiding and/or reducing the consequences of a collision between motor vehicle K and approaching object O.

FIG. 3 schematically depicts one exemplary embodiment of the method according to the present invention.

In step 300, the method is started.

In step 302, objects A1, A2, A3, O in the surroundings of motor vehicle K shown by way of example in FIG. 1 are detected, and the speed of motor vehicle K, as well as the distances and speeds of the detected objects relative to motor vehicle K, are ascertained.

In step 304, it is ascertained whether objects A1, A2, A3, O detected in step 302 include at least one object O which is approaching motor vehicle K in such a way that a collision between this object O and motor vehicle K is imminent. If none of the detected objects pose the risk of a collision, step 302 follows. If at least one of the objects poses the risk of a collision with motor vehicle K, step 306 follows.

In step 306, objects A1, A2, A3, O in the surroundings of motor vehicle K are warned by motor vehicle K. This may, for example, take place by flashing at least one portion or multiple portions of light system 210 on the outside of motor vehicle K. In addition, for example, audible signals may also be used as a warning. Step 308 follows.

In step 308, a friction coefficient variable R, which describes the friction coefficient potential of motor vehicle K, is ascertained, and based on this variable, the friction coefficient potential of approaching object O is also determined. For example, the friction coefficient potential may be assumed to be homogeneous if it possible to assume that the road conditions, for example, weather conditions and/or structural conditions, on the relevant section of road, as depicted by way of example in FIG. 1 as a three-lane section of a freeway, are the same. Step 310 follows.

In step 310, braking distances for both motor vehicle K and for approaching object O are calculated as a function of the ascertained speed of motor vehicle K, the ascertained speed of approaching object O relative to motor vehicle K, and friction coefficient variables R determined in the previous step.

In step 314, the two braking distances of the motor vehicle and approaching object O are summed and compared, according to predefined criteria, with the distance between motor vehicle K and the approaching object. Should it be possible to avoid the collision by braking motor vehicle K and/or object O approaching motor vehicle K, step 400 follows. Should it no longer be possible to avoid a collision by braking motor vehicle K and/or the approaching object, step 316 follows.

In step 400, at least one action for avoiding and/or reducing the consequences of a collision between motor vehicle K and approaching object O is carried out. The particular action which is carried out is a function of the distance between motor vehicle K and approaching object O, which was compared according to predefined criteria, and/or the summed braking distance which was calculated in step 314. This may, for example, be an automatically increased brake boost or even an automatic full deceleration, if the driver brakes. Furthermore, for example, as another action, an automatic deceleration may begin if the driver does not brake, or braking with full deceleration may be applied without waiting for the driver of motor vehicle K to brake. After carrying out at least one action, step 302 follows.

In step 316, it is determined whether a collision between motor vehicle K and approaching object O may be avoided if at least one evasive maneuver is carried out by motor vehicle K, as a function of the distance between motor vehicle K and approaching object O, which was compared according to predefined criteria, and the summed braking distance which was calculated in step 314. Should it be possible to avoid a collision with the aid of an evasive maneuver by motor vehicle K, step 500 follows. Should it no longer be possible to avoid a collision via an evasive maneuver by motor vehicle K, step 318 follows.

In step 500, at least one action for avoiding and/or reducing the consequences of a collision between motor vehicle K and approaching object O is carried out. The particular action which is carried out is a function of the distance between motor vehicle K and approaching object O, which was compared according to predefined criteria, and/or the speed of object O relative to motor vehicle K. This may, for example, be a haptic signal in the steering wheel of motor vehicle K, which advises the driver of motor vehicle K of a preferred evasion direction, and/or assistance for the driver of motor vehicle K via an automatic adjustment of the steering ratio. Additional actions may, for example, be a dynamic correction of the steering angle or a lane-change maneuver which is automatically carried out by motor vehicle K. As a function of predefined comparison criteria, a decision may thus be made as to the particular direction in which motor vehicle K swerves for avoiding and/or reducing the consequences of a collision between motor vehicle K and the approaching object, it being possible, for example, to use an orientation by approaching object O to the left or right relative to motor vehicle K, and/or, for example, the indication of an evasion of approaching object O, for determining the evasion direction. After carrying out at least one action, step 302 follows.

In step 318, actions for reducing the consequences of a collision between motor vehicle K and approaching object O are carried out. This may, for example, be a deceleration of motor vehicle K in order to minimize the impact energy. In addition, for example, an evasive maneuver may be carried out in order to avoid a head-on collision of motor vehicle (K) with approaching object (O). In addition, other actions, for example, adjustment of the safety belts of the motor vehicle and/or preparation of the airbags, may be carried out.

In step 320, the exemplary method is terminated.

Of course, other exemplary embodiments and hybrid forms of the depicted examples are possible.

What is claimed is:

1. A method for avoiding a collision of a motor vehicle with at least one other object which approaches the motor vehicle in such a way that a collision between the motor vehicle and the approaching object is imminent, the method comprising:
    ascertaining a friction coefficient variable which represents a friction coefficient potential of the motor vehicle;
    performing, as a function of the friction coefficient variable, at least one action for at least one of: avoiding, and reducing consequences of a collision between the motor vehicle and the approaching object;
    ascertaining a first speed value which represents a speed of the motor vehicle and a second speed value which represents a speed of the approaching object relative to the motor vehicle;
    determining at least one of: i) a first braking distance value which represents a braking distance of the motor vehicle, and ii) a second braking distance value which represents a braking distance of the approaching object, as a function of the friction coefficient variable, the first speed value, and the second speed value; and
    carrying out at least one action for at least one of avoiding and reducing the consequences of a collision between the motor vehicle and the approaching object, as a function of at least one of the determined first braking distance value of the motor vehicle, and the determined second braking distance value.

2. The method as recited in claim 1, further comprising:
    ascertaining a distance value which represents a distance between the motor vehicle and the approaching object;
    determining from the ascertained first braking distance value of the motor vehicle and the ascertained second braking distance value of the approaching object, an absolute braking distance, as a sum of the braking distance of the motor vehicle and the braking distance of the approaching object; and
    comparing the absolute braking distance and the distance between the motor vehicle and the approaching object; and
    carrying out at least one action for at least one of avoiding and reducing the consequences of a collision between the motor vehicle and the approaching object as a function of predefined comparison criteria.

3. The method as recited in claim 1, further comprising:
    informing, by the motor vehicle, a driver of the motor vehicle about the imminent collision due to the approaching object, the informing being performed via at least one of: i) haptic signals, ii) audible signals, iii) visual signals.

4. The method as recited in claim 1, further comprising:
    informing about the imminent collision due to the approaching object via at least one of: i) flashing of tail lights, ii) flashing of warning lights, iii) flashing of brake lights, iv) flashing of low-beam lights, v) flashing of high-beam lights, vi) flashing of fog lights, and vii) audible signals, and viii) radio signals.

5. The method as recited in claim 2, wherein, if the comparison with the distance between the motor vehicle and the approaching object indicates that the absolute braking distance is sufficient, according to the predefined comparison criteria, to avoid a collision between the motor vehicle and the approaching object, at least one of: i) a driver of the motor vehicle is informed about a braking operation, ii) the driver of the motor vehicle is assisted when braking via an increased brake boost, iii) the motor vehicle automatically brakes with full deceleration as soon as the driver brakes, as a function of at least one of the distance, the first speed value, and the second speed value, as an action for avoiding a collision between the motor vehicle and the approaching object.

6. The method as recited in claim 2, wherein, if the comparison with the distance between the motor vehicle and the approaching object indicates that the absolute braking distance is sufficient, according to the predefined comparison criteria, to avoid a collision between the motor vehicle and the approaching object, the motor vehicle brakes automatically, as a function of at least one of the distance, the first speed value, and the second speed value, as an action for avoiding a collision between the motor vehicle and the approaching object, when a driver of the motor vehicle does not brake.

7. The method as recited in claim 2, wherein, if the comparison with the distance between the motor vehicle and the approaching object indicates that the absolute braking distance is sufficient, according to the predefined comparison criteria, to avoid a collision between the motor vehicle and the approaching object, the motor vehicle brakes automatically brakes with full deceleration.

8. The method as recited in claim 2, wherein, if the comparison with the distance between the motor vehicle and the approaching object indicates that the absolute braking distance is not sufficient, according to the predefined comparison criteria, to avoid a collision between the motor vehicle and the approaching object, at least one of: i) a driver of the motor vehicle is informed about an evasive maneuver, as a function of at least one of the distance, the first speed value, and the second speed value, as an action for avoiding a collision between the motor vehicle and the approaching object, ii) the driver is informed while steering about which evasion direction would be advantageous via at least one of a haptic, audible, and visual signal, and iii) the driver is assisted while steering via an adjustment of a steering behavior by the motor vehicle.

9. The method as recited in claim 2, wherein, if the comparison with the distance between the motor vehicle and the approaching object indicates that the absolute braking distance is not sufficient, according to the predefined comparison criteria, to avoid a collision between the motor vehicle and the approaching object, at least one of: i) an evasion by a driver of the motor vehicle is adjusted via an automatic adjustment of at least one of a direction and a speed on the part of the motor vehicle, ii) the motor vehicle carries out an automated evasive maneuver, as a function of at least one of the distance, the first speed value, and the second speed value, as an action for avoiding a collision between the motor vehicle and the approaching object.

10. A device for avoiding a collision of a motor vehicle with at least one other object which approaches the motor vehicle in such a way that a collision between the motor vehicle and the approaching object is imminent, comprising:
    an element using which a friction coefficient variable which represents a friction coefficient potential of the motor vehicle may be ascertained, and at least one action for at least one of avoiding and mitigating consequences of a collision between the motor vehicle and the approaching object may be carried out, as a function of the friction coefficient variable; and
    an additional element using which a first speed value which represents a speed of the motor vehicle and a second speed value which represents a speed of the approaching object relative to the motor vehicle may be ascertained, and at least a first braking distance value which represents at least one of a braking distance of the motor vehicle and a second braking distance value which represents a braking distance of the approaching object are determined, as a function of at least one of the friction coefficient variable, the first speed value, and the second speed value, and at least one action for at least one of avoiding and reducing the consequences of a collision between the motor vehicle and the approaching object may be carried out, as a function of at least one of the determined first braking distance value of the motor vehicle and the determined second braking distance value.

\* \* \* \* \*